Dec. 6, 1955 C. E. BRANICK 2,725,928
BODY SUPPORT FOR VEHICLES
Filed Oct. 7, 1954
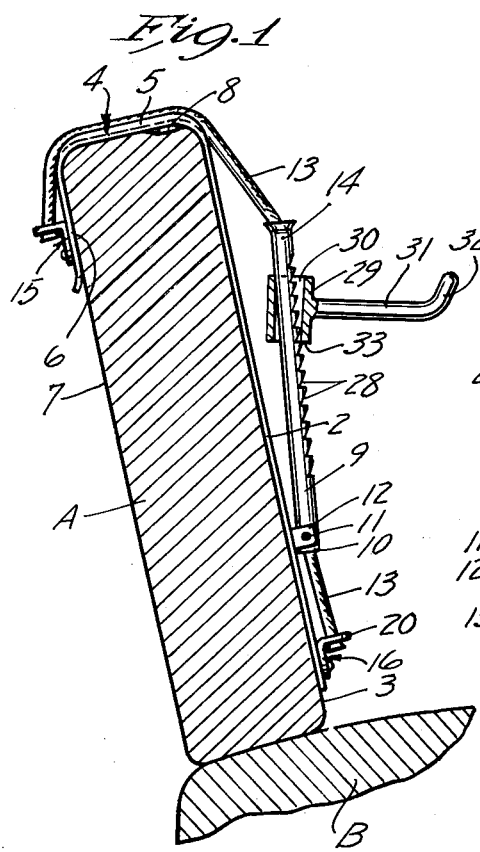
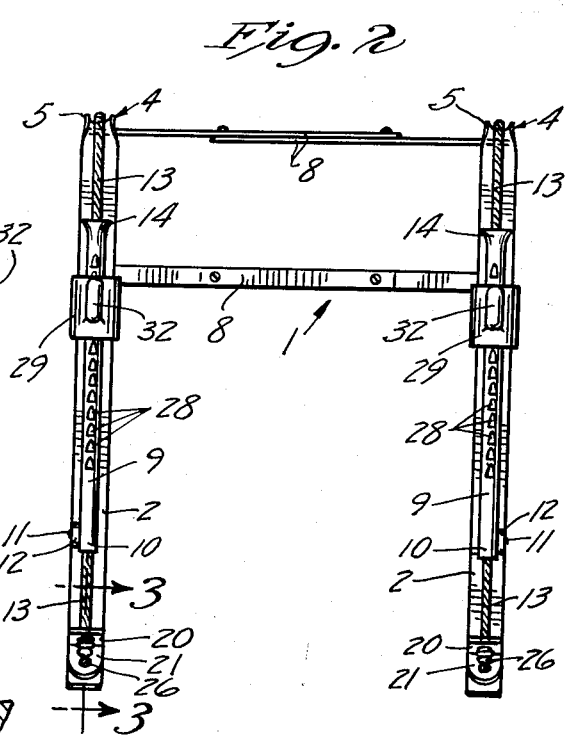
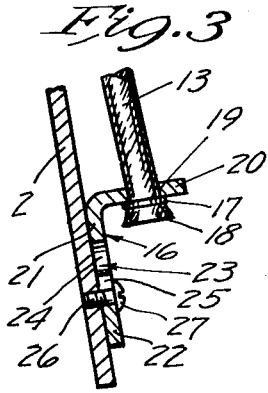
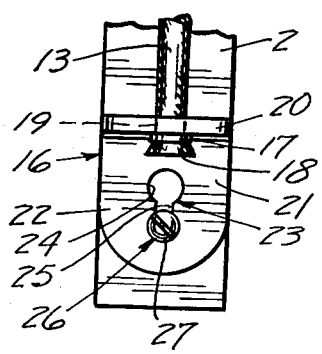
INVENTOR.
Charles E. Branick
BY
Merchant & Merchant
ATTORNEYS

United States Patent Office 2,725,928
Patented Dec. 6, 1955

2,725,928

BODY SUPPORT FOR VEHICLES

Charles E. Branick, Fargo, N. Dak.

Application October 7, 1954, Serial No. 460,888

5 Claims. (Cl. 155—198)

My invention relates to body supports for use in automotive and other vehicle seats.

More particularly, my invention provides a novel structure for partially supporting the back of a driver or passenger of a vehicle.

Still more specifically, my invention provides a novel device to be readily attached to and detached from the conventional seat back of an automotive or other vehicle, and which device is provided with vertically adjustable armpit engaging saddles designed to relieve the back or upper portion of the torso of a vehicle driver or passenger from any desired amount of weight.

A still further and highly important object of my invention is the provision of a device of the class immediately above described which may be rigidly secured to the seat of a vehicle, but which will permit forward and downward movements of the armpit engaging saddle elements against the yielding tension of an elastic member.

A still further object of my invention is the provision of a device of the class above described which is relatively inexpensive to produce, which has a minimum of working parts, and which is extremely durable.

A still further object of my invention is the provision of a device of the class described which is easy to adjust and not unsightly in appearance.

The above and still further objects of my invention will become apparent from the following detailed specification, appended claims and attached drawings.

Referring to the drawings wherein like characters indicate like parts throughout the several views:

Fig. 1 is a view in side elevation showing my novel structure secured to a conventional seat back, said seat back being shown in vertical section;

Fig. 2 is a view in front elevation;

Fig. 3 is an enlarged fragmentary view taken substantially on the line 3—3 of Fig. 2; and Fig. 4 is a view in front elevation of the structure of Fig. 3.

Referring with greater particularity to the drawings, the letter "A" indicates the seat back of a conventional automotive vehicle, the horizontal portion of the seat being identified by the letter "B."

Shown as being secured to the seat back "A" is a frame 1 comprising a pair of supporting members 2, preferably, and as shown, formed from metal straps. The supporting members 2, as shown, are adapted to rest upon the front surface 3 of the seat back "A" and have their upper end portions bent backwardly and downwardly to provide hooks 4 which engage the upper end portions of the seat backs "A," the substantially horizontal portions of the hooks 4 being identified by the numeral 5, and the depending portions by the numeral 6. The back surface of the seat backs "A" is identified by the numeral 7. As shown in Fig. 2, the supporting members 2 are tied together in spaced apart relationship, approximating the width of an occupant on the seat "B," by means of spaced tie bars 8.

A pair of legs 9, preferably and as shown being tubular in form, have their lower end portions 10 pivotally secured, one each to the lower end portions of the supporting members 2. As shown, this is accomplished by means of pivot pins 11 passing therethrough and through ears 12 secured to and projecting forwardly of the supporting members 2. Tie members in the form of elastic cords 13 pass through the tubular legs 9 and have their opposite ends secured to opposite end portions of the supporting members 2, thus yieldingly biasing the upper end portions 14 of the legs 9 toward engagement with their cooperating supporting members 2. Tie members 13 preferably incorporate a plurality of suitably bound-together, relatively small rubber bands, so as to elongate only under considerable tension. The connection of the upper ends of the tie elments 13 to the downturned portions of the hooks 4 is identified by the numeral 15, whereas the connections of the lower ends of the tie members 13 to the extreme lower ends of the supporting members 2 is identified by the numeral 16. Each of the connections 15 and 16 includes a clamping ring 17, see particularly Figs. 3 and 4, which prevent the free ends 18 of the tie members 13 from passing through apertures 19 in angular portions 20 of the L-shaped brackets 21. Brackets 21 also include portions 22 which engage the supporting members 2. Portions 22 of brackets 21 are provided with keyhole openings 23, the larger ends of which are identified by the numeral 24 and the restricted ends by the numeral 25. Headed pins, in the fom of screws 26, are receivable within the larger ends 24 and are biased by the tie members 13 to cause engagement of the pins 26 with the reduced ends 25. As shown in Fig. 4, the head 27 of the pins 26 will not pass through the reduced ends 25.

Preferably and as shown, the tubular legs 9 are provided along their forward faces with tooth-like notches 28. Collars 29 having axial openings 30 therethrough of a diameter considerably greater than the external diameter of the legs 9, are loosely slidably received upon the legs 9. Projecting radially and forwardly from the collars 29 are armpit saddle elements 31, preferably and as shown, having upturned end portions 32. It will be noted, particularly by reference to Fig. 1, that downward and forward movements of the armpit saddle elements 31 will cause the lower edge 33 of the loose-fitting collars 29 to engage a given and desired one of the tooth-like notches 28.

The frame 1 of my novel structure may be quickly placed upon the seat back "A" of an automotive or other vehicle in a manner whereby the supporting members 2 are positioned on opposite sides of a given vehicle passenger or driver. Such a person then vertically adjusts the armpit saddle elements 31 to cause same to take the desired amount of weight off of his back. With my novel arrangement forward and downward movements of a body partially supported on the armpit saddle elements 31 is only accomplished by elongation of the elastic tie elements 13. The combination of the great strength and the great length of the tie elements 13 cooperate to make forward movements firm but smooth.

My invention has been thoroughly tested and found to be highly satisfactory for the accomplishment of the above objects and while I have illustrated a preferred embodiment, I wish it to be specifically understood that same is capable of modification without departure from the scope of the appended claims.

What I claim is:

1. In a device of the class described, a generally upright supporting member adapted to rest upon the front surface of a vehicle seat back, said supporting member having its upper end portion formed to provide a downwardly opening seat back engaging hook, a leg pivotally secured at its lower end on a horizontal axis to the lower end portion of said supporting member, an armpit saddle element mounted for vertical adjustments on said leg, and an elastic tie member extending between the upper end portion of said leg and said seat back engaging hook and biasing said leg toward engagement with said supporting member.

2. The structure defined in claim 1 in which said leg is tubular, said tie member extending through said tubular leg and having its opposite ends secured to opposite end portions of said supporting member.

3. The structure defined in claim 2 in which at least one end of said tie member is secured to said supporting member by means of a bracket, said bracket being provided with a keyhole opening, a headed pin on said supporting members, the head on said pin being of a size to pass through the larger end of the keyhole opening but incapable of passing through the smaller end thereof, said tie element biasing said bracket to cause said pin to be received within the smaller end of said keyhole opening.

4. In a device of the class described, a pair of generally upright supporting members adapted to rest upon the front surface of a vehicle seat back, said supporting members being spaced apart approximately the width of a passenger to be received on said seat and having their upper end portions formed to provide downwardly opening seat back engaging hooks, means rigidly tying said supporting members together in said spaced relation, tubular legs pivotally secured on horizontal axes at their lower ends one each to the lower end portions of one of said supporting members, armpit saddle elements mounted for vertical adjustment on said legs, and elastic tie members extending through said tubular legs and having their opposite ends secured to opposite end portions of said supporting members, said tie elements biasing the upper ends of said legs toward engagement with their cooperating supporting members.

5. The structure defined in claim 4 in which the tie members overlie the hooks of their cooperating supporting members, said supporting members being formed from metal straps and having their hooked upper end portions bent to form channels whereby to prevent lateral shifting of said tie elements with respect thereto.

References Cited in the file of this patent

UNITED STATES PATENTS

| | | |
|---|---|---|
| 491,093 | Edgerton | Feb. 7, 1893 |
| 2,650,650 | Brown | Sept. 1, 1953 |
| 2,667,913 | Dustin | Feb. 2, 1954 |
| 2,667,917 | Dustin | Feb. 2, 1954 |